United States Patent [19]
Willard et al.

[11] Patent Number: 5,600,312
[45] Date of Patent: Feb. 4, 1997

[54] MESSAGING SYSTEM AND METHOD HAVING ROAMING CAPABILITY AND CONTROLLED GROUP MESSAGING

[75] Inventors: David F. Willard, Plantation; Robert J. Schwendeman, Pompano Beach; Eric T. Eaton, Lake Worth; Barbara D. Laflin, Ocean Ridge, all of Fla.

[73] Assignee: Motorola, Inc., Schaumburg, Ill.

[21] Appl. No.: 401,317

[22] Filed: Mar. 9, 1995

Related U.S. Application Data

[63] Continuation-in-part of Ser. No. 378,136, Jan. 24, 1995.

[51] Int. Cl.$^6$ ........................................ H04Q 7/18
[52] U.S. Cl. .................. 340/825.47; 340/311.1; 340/825.44; 379/56; 455/57.1
[58] Field of Search ............................. 455/186.1, 38.2, 455/57.1; 340/22, 37, 311.1, 825.44, 825.47, 825.52, 825.68, 825.69; 379/56, 57

[56] References Cited

U.S. PATENT DOCUMENTS

| | | |
|---|---|---|
| 4,644,347 | 2/1987 | Lucas .............................. 340/825.44 X |
| 4,713,808 | 12/1987 | Gaskill et al. . |
| 4,734,694 | 3/1988 | Umetsu et al. ..................... 340/825.47 |
| 4,914,649 | 4/1990 | Schwendeman et al. ................ 370/50 |
| 4,977,611 | 12/1990 | Maru . |
| 5,010,330 | 4/1991 | Snowden et al. .............. 340/825.21 X |
| 5,136,719 | 8/1992 | Gaskill et al. . |
| 5,168,271 | 12/1992 | Hoff ................................... 340/825.44 |
| 5,187,470 | 2/1993 | King et al. ..................... 340/825.47 X |
| 5,196,842 | 3/1993 | Gomez et al. ..................... 340/825.44 |
| 5,254,986 | 10/1993 | Deluca ................................ 340/825.44 |
| 5,450,071 | 9/1995 | Deluca et al. ................. 340/825.47 X |

FOREIGN PATENT DOCUMENTS

| | | | |
|---|---|---|---|
| 91/06190 | 5/1991 | WIPO | .............................. 340/825.44 |

*Primary Examiner*—Michael Horabik
*Assistant Examiner*—William H. Wilson, Jr.
*Attorney, Agent, or Firm*—D. Andrew Floam

[57] ABSTRACT

A messaging system and method capable of transmitting group messages throughout a Network (200) such that receivers which are outside of a "local" or "home" area of coverage receive such group messages, whereas receivers which are in a "local" area of coverage over ride and do not receive the group message as a result of decoding system identifiers and ignoring those messages having network roaming identification.

12 Claims, 11 Drawing Sheets

FIG. 4

1 2 3 4 5 6 7 ......21......31 32
INFORMATION | PARITY | CK
x0 x1 x2 x3 c0 c1 c2 c3 f0 f1 f2 f3 f4 f5 f6 n0 r0 t0 t1 t2 t3 p p p p p p p p
0 0 1 1 1 1 0 0 0 1 1 1 0 0 0 0 0 1

FIG. 5

1 2 3 4 5 6 7 ......21......31 32
INFORMATION | PARITY | CK
x0 x1 x2 x3 P0 P1 P2 P3 a0 a1 v0 v1 v2 v3 v4 v5 c0 c1 m0 m1 m2 p p p p p p 0 1 1
0 1 0 1 0 1 0 0 1 1 1 1 0 0 1 1

FIG. 6

1 2 3 4 5 6 7 ......21......31 32
INFORMATION | PARITY | CK
x0 x1 x2 x3 f0 f1 f2 s0 s1 s2 s3 s4 s5 s6 s7 s8 s9 s10 s11 s12 s13 p p p p p p
1 1 0 1 1 0 0 1 0 1 0 0 1 1 1 0 1 1

| FRAME | A | B | C | D |
|---|---|---|---|---|
| 0 | LID1  T<br>LID2 | T | T | T |
| 1 |  | LID1<br>LID2 |  |  |
| 2 |  |  | LID1<br>LID2 |  |
| 3 |  |  |  | LID1<br>LID2 |
| 4 | LID1 |  |  |  |
| 5 |  | LID1 |  |  |
| 6 |  |  | LID1 |  |
| 7 |  |  |  | LID1 |
| 8 | LID1 |  |  |  |
| 9 |  | LID1 |  |  |
| 10 |  |  | LID1 |  |
| 11 |  |  |  | LID1 |
| 12 | LID1 |  |  |  |
| 13 |  | LID1 |  |  |
| 14 |  |  | LID1 |  |
| 15 |  |  |  | LID1 |
| 16 | LID1 |  |  |  |
| 17 |  | LID1 |  |  |
| 18 |  |  | LID1 |  |
| 19 |  |  |  | LID1 |
| 20 | LID1 |  |  |  |
| ⋮ |  |  |  |  |
| 127 |  |  |  | LID1 |

*FIG. 11*

| FRAME | A | B | C | D |
|---|---|---|---|---|
| 0 | LID1 LID2 N1 | T    T | T | T |
| 1 |  | LID1 LID2 |  |  |
| 2 |  |  | LID1 LID2 |  |
| 3 |  |  |  | LID1 LID2 N4 |
| 4 | LID1 N5 |  |  |  |
| 5 |  | LID1 N7 N6 |  |  |
| 6 |  |  | LID1 |  |
| 7 |  |  |  | LID1 N8 |
| 8 | LID1 N9 |  |  |  |
| 9 |  | LID1 N10 |  |  |
| 10 |  |  | LID1 |  |
| 11 |  |  |  | LID1 |
| 12 | LID1 |  |  |  |
| 13 |  | LID1 N2 |  |  |
| 14 |  |  | LID1 |  |
| 15 |  |  |  | LID1 N3 |
| 16 | LID1 |  |  |  |
| 17 |  | LID1 |  |  |
| 18 |  |  | LID1 |  |
| 19 |  |  |  | LID1 |
| • | LID1 |  |  |  |
| • |  |  |  |  |
| • |  |  |  |  |
| • |  |  |  |  |
| 127 |  |  |  | LID1 |

*FIG. 13*

| FRAME | A | B | C | D | |
|---|---|---|---|---|---|
| 0 | LID1 LID2 (N1) | T T2 | T1 T2 | T1 T2 | T1 |
| 1 | | LID1 LID2 (N2) | | | |
| 2 | | | LID1 LID2 (N3) | | |
| 3 | | | | LID1 LID2 (N4) | |
| 4 | LID1 (N5) | | | | |
| 5 | | LID1 (N6) | | | |
| 6 | | | LID1 (N7) | | |
| 7 | | | | LID1 (N8) | |
| 8 | LID1 (N9) | | | | |
| 9 | | LID1 (N10) | | | |
| 10 | | | LID1 (N1) | | |
| 11 | | | | LID1 (N2) | |
| 12 | LID1 (N3) | | | | |
| 13 | | LID1 (N4) | | | |
| 14 | | | LID1 (N5) | | |
| 15 | | | | LID1 (N6) | |
| 16 | LID1 (N7) | | | | |
| 17 | | LID1 (N8) | | | |
| 18 | | | LID1 (N9) | | |
| 19 | | | | LID1 (N10) | |
| ⋮ | LID1 N1 | | | | |
| 127 | | | | LID1 | |

MESSAGING SYSTEM AND METHOD HAVING ROAMING CAPABILITY AND CONTROLLED GROUP MESSAGING

RELATED APPLICATION

The present application is a continuation-in-part of commonly assigned application entitled "Messaging System Having Roaming Capability", Ser. No. 08/378,136 filed on Jan. 24, 1995, to Willard et al. our Docket No. PT01917U.

FIELD OF THE INVENTION

The present invention relates to messaging systems, and more particularly to a messaging system having the capability for a receiver to roam and receive messages across a multitude of coverage areas.

BACKGROUND OF THE INVENTION

In today's mobile society, it is desirable to be reachable, such as, by a selective call receiver (pager), everywhere one travels, both locally close to home, as well as in more distant locations in the same country or across the world.

A messaging method and system that is capable of accommodating roaming portable communication receivers, such as pagers, between coverage areas of the same service provider and across coverage areas of different service providers is extremely useful. It is additionally desirable to transmit group messages to those receivers which are roaming outside of "home" areas, while preventing the delivery of group messages to those receivers which are in their "home" areas.

SUMMARY OF THE INVENTION

It is an object of the present invention to provide a signaling protocol suitable for message transmission to a plurality of addressable receivers which is capable of accommodating message transmission to receivers which roam between service coverage areas.

It is a further object of the present invention to provide a signaling protocol suitable for message transmission to a plurality of addressable receivers which is capable of accommodating roaming receivers and maintaining battery saving performance in the receivers.

It is another object of the present invention to provide a signaling protocol suitable for message transmission to a plurality of addressable receivers which is capable of accommodating roaming receivers have frequency scanning capability.

It is a further object of the present invention to provide a signaling protocol suitable for message transmission to a plurality of addressable receivers which is capable of accommodating roaming receivers, and in which channel selection and roaming information comparisons made in the receiver are simplified.

It is still a further object of the present invention to provide a signaling protocol suitable for message transmission to a plurality of addressable receivers which is capable of accommodating roaming receivers and to provide a receiver with a confirmation of its roaming status.

It is yet another object of the present invention to accommodate multiple protocols on the same channel as well as roaming operation on a radio frequency channel shared by two or more service providers.

It is even a further object of the present invention to provide an efficient process to combine and redirect roaming traffic in a messaging system.

Still another object is to provide controlled group messaging to receivers such that receivers which are outside of a "local" or "home" area of coverage receiver group messages, whereas receivers which are in a "local" area of coverage over ride and to not receive the group message.

The above and other objects and advantages will become more readily apparent when reference is made to the following description, taken in conjunction with the accompanying drawings.

BRIEF DESCRIPTION OF THE DRAWINGS

FIG. 4 illustrates a structure of a frame information word according to the present invention.

FIGS. 5 and 6 illustrate structures of block information words in which single simulcast identification (SSID) information is coded.

FIG. 11 is frame diagram illustrating the placement of the SSID and time information in accordance with the present invention.

FIG. 12 is a frame diagram illustrating a first placement configuration of the NRI information in accordance with the present invention.

FIG. 13 is a frame diagram illustrating a second placement configuration of the NRI information in accordance with the present invention.

DETAILED DESCRIPTION OF THE DRAWINGS

The present invention is directed to a selective call communication system capable of servicing or transmitting messages to receivers roaming between coverage areas. An example of a selective call signaling system to which the present invention relates is disclosed in commonly assigned U.S. Pat. No. 5,128,665. The entire text and drawings of U.S. Pat. No. 5,128,665 are herein incorporated by reference. The present invention, however, is not in any way limited to a particular type of signaling protocol, and has utility in many types of communication systems, a paging or messaging system being only an example.

Figure 15:
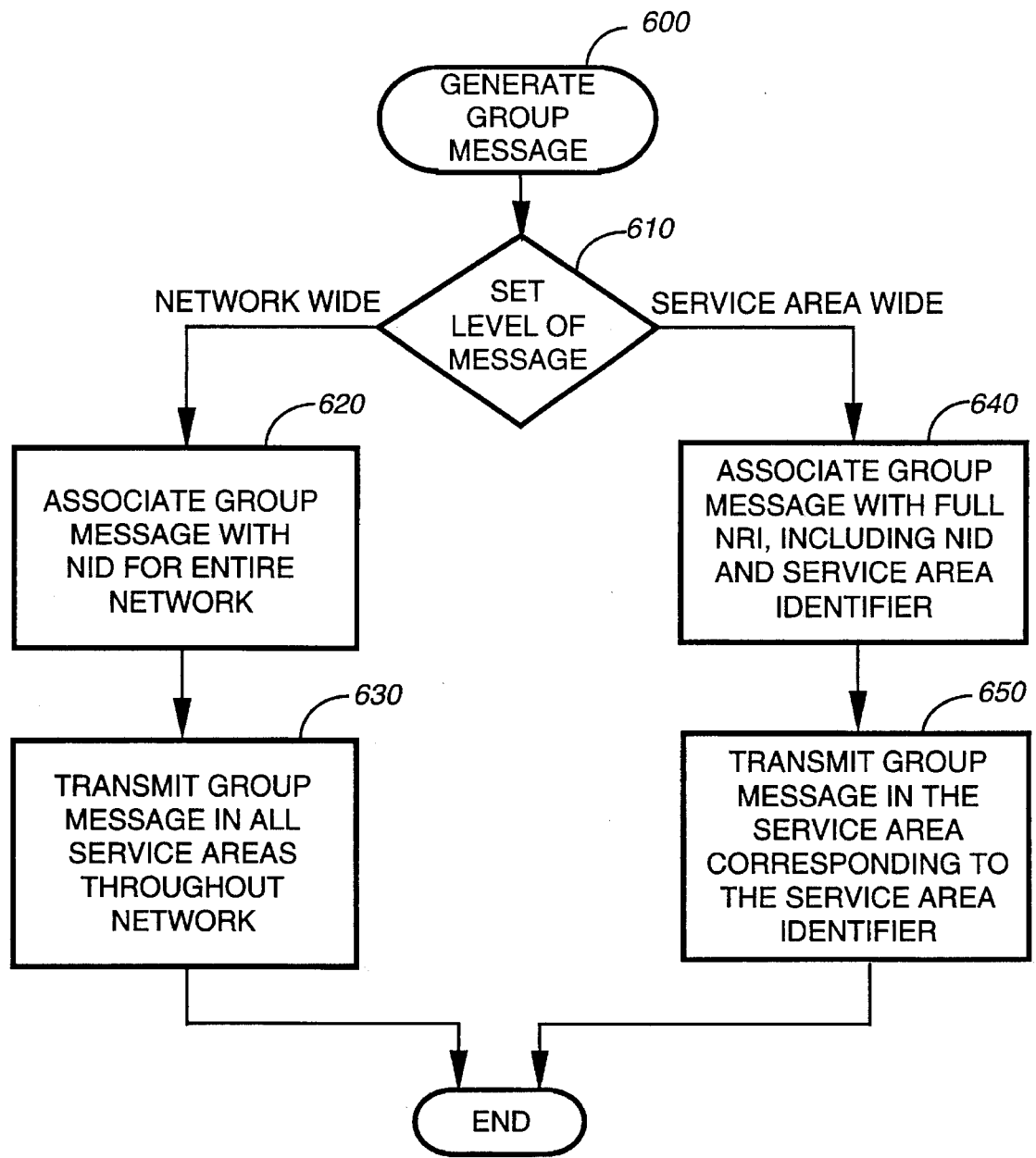
FIG. 15 is a flow chart illustrating how a group message is generated and transmitted according to the present invention.
Figure 16:
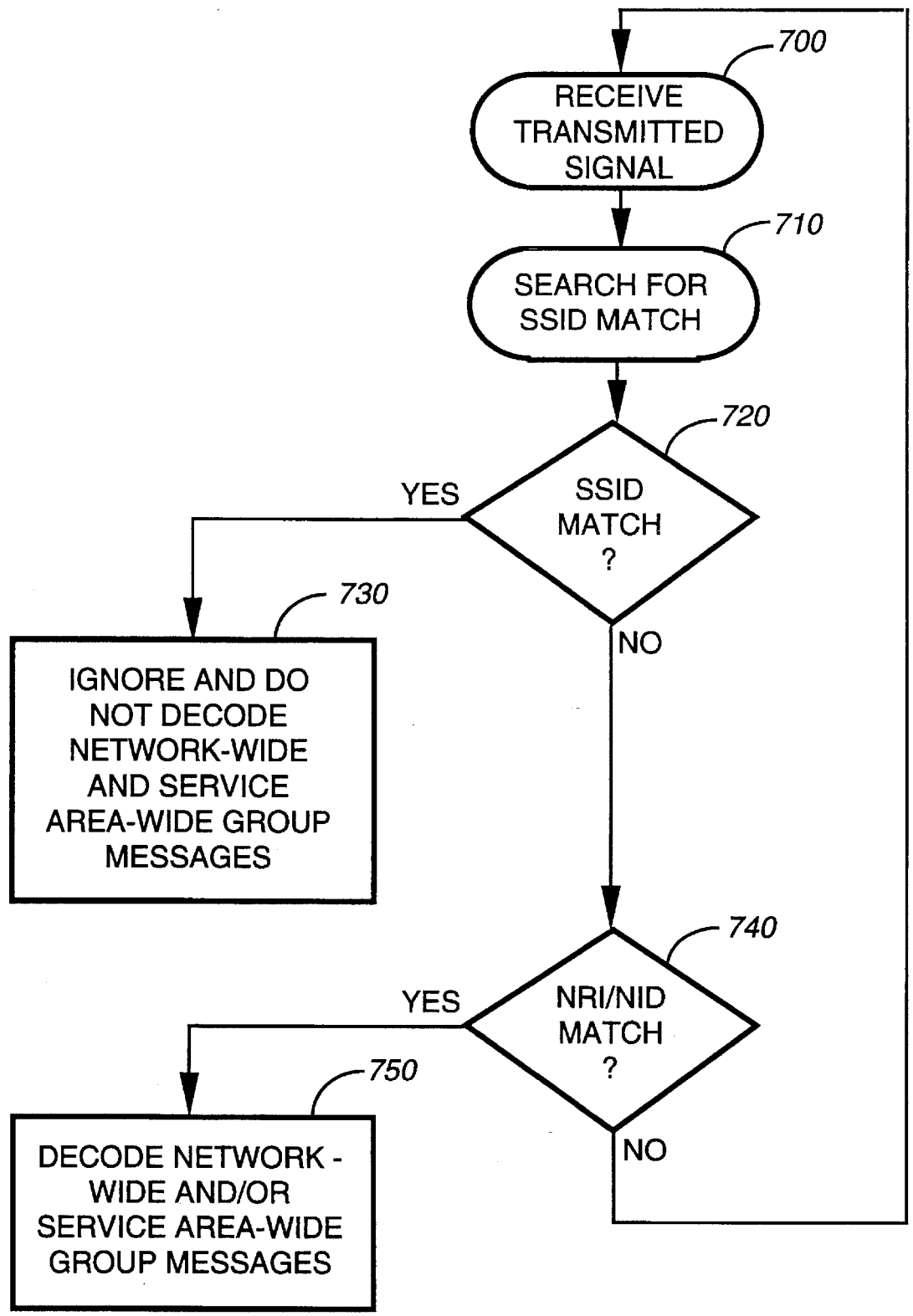
FIG. 16 is a flow chart illustrating how a group message is received or not received by a receiver, according to the present invention.

The present invention is directed to an enhancement to a messaging system, such as the one disclosed in the aforementioned co-pending applications. In this regard, FIGS. 1–14 and 17 and 18 are duplicates of drawings found in the co-pending application. A description of each of these drawings is provided herein for the sake of completeness. FIGS. 8, 15 and 16 particularly illustrate the enhancement.

Figure 1:
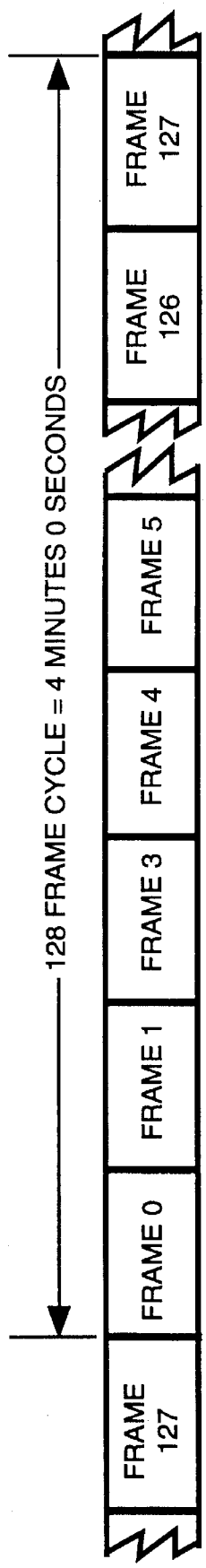
FIGS. 1–3 are timing diagrams illustrating a signaling protocol in accordance with the present invention.
Figure 2:
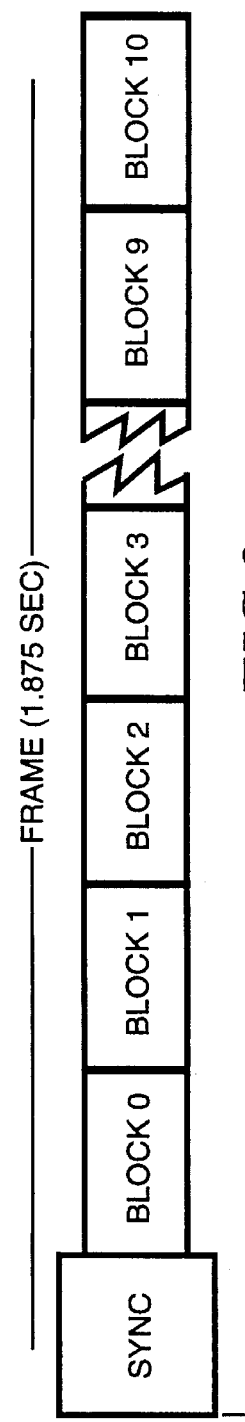
Figure 3:
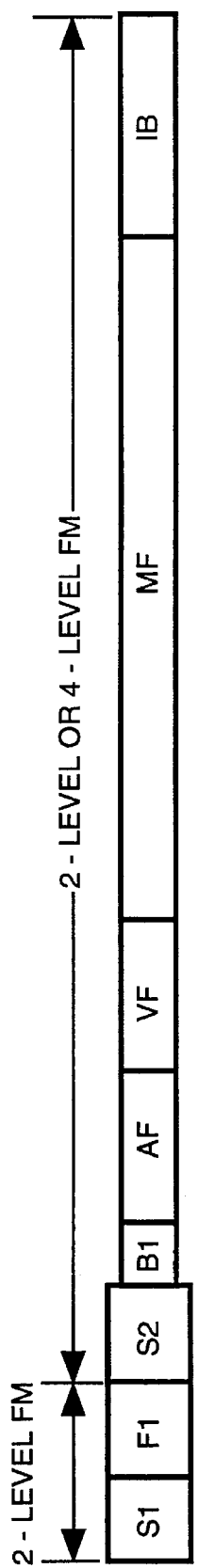

Referring to FIGS. 1–3, an example of a selective call communication system to which the present invention pertains is shown. The signaling system shown comprises 128 frames, with each frame numbered 0 to 127. The frames are transmitted at 32 frames per minute, and thus a full 128 frame cycle lasts 4 minutes. One hour is divided into 15 cycles numbered 0 through 14. It is a synchronous time slot protocol tied to a universal time reference. Frame 0 is synchronized to the start of each hour so that the receiver can derive real time from the current frame and cycle number, thus providing the receiver accurate time within the hour with no need for adjustment.

Moreover, the protocol supports multiple time division multiplexed "phases", wherein for example, a 6400 bits per second (bps) data stream is time division multiplexed into four data streams of 1600 bps. Such a signaling structure is disclosed in commonly assigned U.S. Pat. No. 5,168,493, the entire text and drawings of which is herein incorporated by reference. Thus, the general frame structure shown in FIG. 1 for the single phase shown in FIG. 1 is the same throughout each of four phases.

Each frame comprises a sync portion and several blocks. The sync portion further comprises a Sync 1 portion (S1), a frame information (FI) word and a Sync 2 portion (S2).

Each receiver is assigned a base frame in the set of 128 frames appearing on an radio frequency (RF) channel. A receiver can trade battery life for the more frequent delivery of messages by being assigned to monitor more than one frame per cycle. Once a receiver acquires synchronization to the RF channel, it expects to find its assigned frame within a very tight time window. The use of 4-level FM doubles the data transmission rate per symbol (as compared to 2-level FM) which helps to reduce the effect of simulcast distribution errors and the effect of propagation timing differences between multiple signals within the capture range of the receiver.

As shown in FIG. 3, the Sync 1 (S1) portion of each frame provides for frame timing, symbol timing and indicates the speed of the remainder of the frame. The frame information (FI) word carries 11 bits for the frame and cycle numbers, 5 bits for indication of the time division multiplexed phase of low traffic, 1 bit called a Network Roaming Channel Bit to indicate the presence of a frequency supporting Network-wide roaming service, and other information. The Network Roaming Channel Bit is used to trigger recognition of certain network roaming information which will be described in conjunction with FIG. 4.

The Sync 2 (S2) portion provides for synchronization at the frame's block speed to allow for proper de-multiplexing and decoding of the blocks.

The Block Information (BI) field is the first 1–4 words, called block information worlds, of the first interleaved block and contains frame and system structure information, some of which is pertinent to the present invention and is explained in greater detail hereinafter.

The address field (AF) starts directly after the block information words and consists of short addresses and long addresses. The vector field (VF) maintains a 1 to 1 relationship with the address field. The vector word points to the start word of the associated message. The message field (MF) contains the message words specified by the vector field. IB represents idle blocks which are unused and are filled with appropriate bit patterns. FIG. 4 illustrates the structure of the frame information word in greater detail. The various parameters in the frame information word are defined as follows:

---

C    Cycle Number (0–14)    c3c2c1c0    15/hour
f    Frame Number (0–127)    f6f5f4f3f2f1f0    128/cycle
n    Network Roaming Channel Bit    n=1 indicates network support for roaming and n=0 indicates no network support for roaming
r    Repeat Paging Indicator
    If r=1, t3t2t1t0 are reserved to indicate a repeat format exists
    If r=0, tt3t2t1t0 are Low Traffic flags for each phase in a frame
t    Definition dependent on value of "r"
    At 3200 bits/sec t3=t2 and t1=to representing two phases in the frame
    At 1600 bits/sec t3=t2=t1=t0 representing one phase in the frame
    t=1    Indicates address field contained in block 0
    t=0    Indicates address field extends past block 0
    These flags give early indication that the traffic is light and all addresses are contained within block 0.
x    Standard 4 bit Check Character

---

FIG. 5 illustrates an example of block information word 1. Block information word 1 has 2 "a" bits, a0a1, which indicate the start of the address field, 6 "v" bits v5v4v3v2v1v0 which define the start of the vector field, 2 "c" bits c1c0 which indicate traffic overflow into the next frame(s), 3 "m" bits m0m1m2 which indicate the number of high order frame number bits to be masked and 4 "P" bits P3P2P1P0, which indicate the number of priority addresses at the beginning of the address field.

FIG. 6 illustrates an example of block information words 2, 3 and 4. Word Format Type is represented by format bits f2f1f0, s represents the data and x again is the standard 4 bit Check Character.

Below is a table which illustrates the bit pattern definitions for the f and s bits shown in FIG. 6. Depending on the values of bits f2f1f0, the data bits s13-s0 have a particular meaning or application. When f2f1f0 is set to (000), bits s13-s0 represent a 9 bit local identification (LID) number (i8-i0) which identifies 512 possible LID's, and a 5 bit Zone number C4C3C2C1C0, which represents 32 possible coverage Zones associated with a particular LID.

| $f_2 f_1 f_0$ | $s_{13} s_{12} s_{11} s_{10} s_9 s_8 s_7 s_6 s_5 s_4 s_3 s_2 s_1 s_0$ | |
|---|---|---|
| 000 | $i_8 i_7 i_6 i_5 i_4 i_3 i_2 i_1 i_0 C_4 C_3 C_2 C_1 C_0$ | 512 Local IDs, 32 Coverage Zones |
| 001 | $m_3 m_2 m_1 m_0 d_4 d_3 d_2 d_1 d_0 Y_4 Y_3 Y_2 Y_1 Y_0$ | Month, Day, Year |
| 010 | $S_2 S_1 S_0 M_5 M_4 M_3 M_2 M_1 M_0 H_4 H_3 H_2 H_1 H_0$ | Sec., Min., Hr. |
| 011 | Reserved for Future Use | |
| 100 | Reserved for Future Use | |
| 101 | $z_9 z_8 z_7 z_6 z_5 z_4 z_3 z_2 z_1 z_0 A_3 A_2 A_1 A_0$ | Data, System Message |
| 110 | Reserved for Future Use | |
| 111 | $C_9 C_8 C_7 C_6 C_5 C_4 C_3 C_2 C_1 C_0 T_3 T_2 T_1 T_0$ | Country Code, Traffic Splitting Flags |

Figure 7:
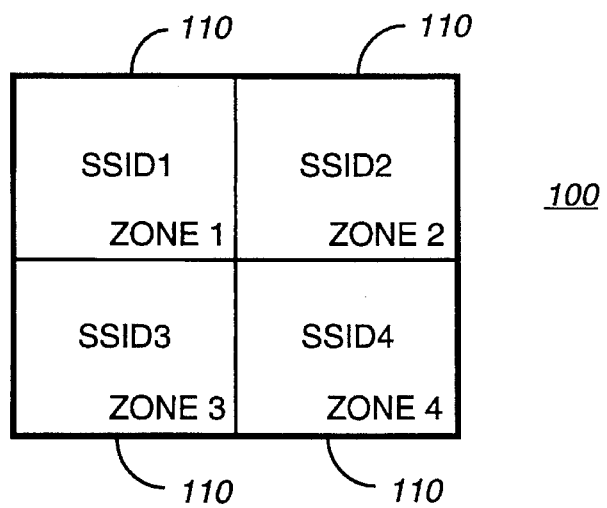
FIG. 7 illustrates a coverage area and zone divisions in accordance with the present invention.
Figure 8:
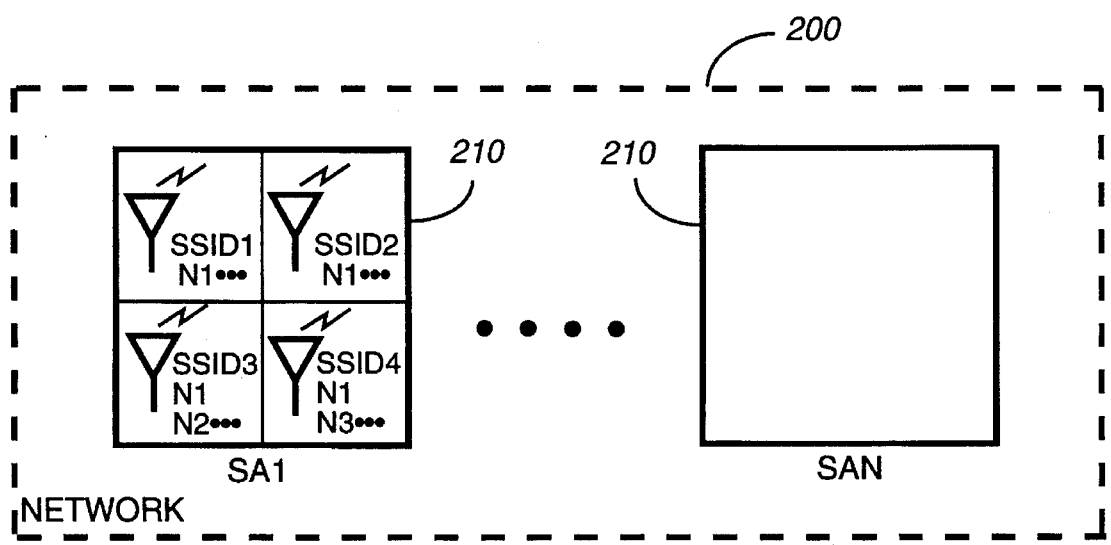
FIG. 8 illustrates a network and service area divisions in a network according to the present invention.

When f2f1f0 is set to (001) and (010), the data bit pattern s13-s0 represents month, day, year, second minute and hour information as shown in FIG. 7. The f2f1f0 bit pattern (101) designates spare data bits s13-s9, a system message A3-A0 and time zone information Z3-Z0.

Finally, of importance is the f2f1f0 bit pattern (111), which indicates a 10 bit Country Code c9-c0 and 4 bits called Traffic Splitting Flags, both of which will be described in more detail hereinafter.

The Country Codes follow, for example, the CCITT Standard which is well known in the art. The 10-bit Country Code is provided to permit reuse of LID's in different countries, following the CCITT standard assignment rules. Country Code information is useful by the non-subscribing receiver to facilitate a more efficient scan search by first identifying in what country the receiver is located.

With reference to FIG. 7, the smallest division of a coverage area 100 is defined by a simulcast system identification (SSID), which is also referred to hereinafter as a "system identifier". An SSID consists of and is uniquely identified by several identifiers: an local service provider identifier or "LID", Zone, Country Code, Traffic Splitting Flags (TSF's) and Frequency. Each Zone 110 has a unique SSID. Thus, if a user desires to receive messages in more than one Zone, the receiver carried by that user would store each of the corresponding SSID's. The Zones shown in FIG. 7 need not be geographically adjacent one another.

In the example shown in FIG. 7, there are 512 possible LID's, each with 32 possible Zones. A "Zone" is a single simulcast area which may be associated with other simulcast areas in a coverage area through a common LID. For example, a service provider is given LID 123456789XXXXX. The service provider has the option to assign this LID to 32 different divisions of a coverage area or Zone. The northern part of a service provider's coverage area may be Zone 1 and would transmit 12345678900001, whereas a southern part is Zone 2 and transmits 12345678900010.

The Traffic Splitting Flags indicate the assignment of 4 groups of roaming traffic to a frequency (channel). Each roaming receiver which finds a frequency to carry a valid LID responds to only one of the 4 Traffic Splitting Flags. When a receiver's assigned flag is equal to 0, the receiver searches for another frequency with the same LID and the assigned flag set equal to 1.

| 1st Word (000) | 9 bits = 512 LID's |
|---|---|
| | 5 bits = 32 Zones |
| 2nd Word (111) | 10 bits = 1024 Country Codes |
| | 4 bits = Traffic Splitting Flags |

The 1st Word, called LID1 hereinafter, corresponds to the first Block information word (000) referred to in FIG. 3, and the 2nd Word, called LID2, corresponds to Block information word (111).

Time and calendar information (block information words f2f1f0=001, 010 and 101) when transmitted, are defined to occur in frame 0, or otherwise in the first valid frame following frame 0. In a roaming capable system, the LID together with the Zone, Country Code and Traffic Splitting Flags occupy the second and third block information words in frame 0. The fourth block information word carries the three available time and calendar information words and are sent in the fourth block information word position in frame 0 in a rotating sequence one block information word at a time over 3 consecutive cycles. This allows the block information words in 001, 010 and 101 to be updated 5 times each hour.

An advantage of this scheme is that these messages are delivered without addresses. System information is used to attach a vector and message to it.

Bits A3-A0 define the type of message and a class of receiver for which it is intended, as shown in the table below. As an example, all receivers should look at this message, receivers which are using SSID frequency information should only look at this message, and/or only receivers which are using network roaming information (NRI) (to be described hereinafter) to lock to this channel should look at this message. Also instructions on which frequency to go to when a Traffic Splitting Flag is changed, and time zone information can be sent.

| A3 | A2 | A1 | A0 | |
|---|---|---|---|---|
| 0 | 0 | 0 | 0 | All message |
| 0 | 0 | 0 | 1 | Local message |
| 0 | 0 | 1 | 0 | Roam message |
| 0 | 0 | 1 | 1 | Roam Instruction |
| 0 | 1 | 0 | 0 | Time Zone |
| **** | | | | |
| 1 | 1 | 1 | 1 | Reserved for future use |

When a system message is indicated, an additional vector is added to the end of the vector field. A receiver decodes block information 4 and determines instruction type and which receivers should look at the message associated with this block information word. After the receiver has determined that it should look at the message it processes the address field and vector field as normal but there will be an additional vector at the end of the vector field. Only the receivers which are instructed to look for a message will look at this vector because all the address/vector combinations will point at message words that are located after this vector which is actually in the location of the first message word for the message field. Up to this point, a certain group of receivers have been informed that there is a message, what type of message to expect, and where to look for this message. Once the receiver enters the message field it decodes the message and handles it according to the message type.

An example of a system message is a greeting message transmitted to a receiver which is roaming into a coverage area outside of its home coverage area.

Another example of the utility of a system message is in connection with the Traffic Splitting Flags. When a service provider has two systems which have the same coverage area (i.e., redundant systems) or overlapping portions of coverage areas, and would like to move traffic from one of the systems to another, the following process is performed.

A system message as described above is sent out informing the receiver of there is going to be a traffic change and the traffic change information is a new frequency XXXXXX. The receiver adds this new frequency to its scan list. The receiver should move to XXXXXX frequency and look for an assigned SSID or NRI on this other frequency. In a later transmission, which could be one month later or it could be 1 minute later, the Traffic Splitting Flag is unset on one frequency and set on the other redundant coverage area system. The receiver detects that roaming traffic is no longer supported on this channel and moves to the frequency it was instructed to go to by the message. Once there, the receiver determines if the SSID or NRI and Traffic Splitting Flag is set correctly. When the SSID or NRI information stored in the receiver match the corresponding transmitted information, the receiver stays on the frequency (and adds this frequency to its scan list). When a match is not made, the receiver will go back to the frequency it was originally on to make sure that it was not a mistake. When that frequency no longer supports the receiver's roaming traffic, the receiver will start looking on its own (scanning the band) for an SSID or NRI match.

Another way to handle traffic splitting is for the system to unset the Traffic Splitting Flag and let the receiver find a new system transmitting that receiver's SSID or NRI.

It should be understood from the foregoing that the same LID and Zone values may be used by the same provider or other providers on other channels.

Stored in each receiver is a list called a scan list, which contains at least one SSID. In each Zone, an SSID is transmitted in a predetermined number of frames, as will be explained hereinafter in conjunction with FIG. 13.

Turning now to FIG. 8, in the case where a receiver desires coverage over a larger region, or to receive messages on multiple frequencies, which would otherwise be defined by multiple SSID's, a single piece of identification information is used, rather than multiple SSID's. This is called network roaming identification information (NRI). A "Network" 200 is defined as a collection of many Service Areas 210 and a Service Area 210 is a coverage area which would otherwise be defined by a plurality of SSID's. Thus, a Service Area 210 comprises multiple zones 110. An NRI consists of a Network identifier (NID), a Service Area identifier (SA) Traffic Splitting Flags, and a 3-bit NID multiplier to expand the number of unique Networks.

A Network may be formed by an agreement between several otherwise separate service providers, or may be a single large service provider. In a Network, there is a plurality of Service Areas, and in the example described herein, there are 32 possible Service Areas within a Network, identified by a 5 bit pattern, but a Network may be defined to consist of many more or less Service Areas.

As shown in FIG. 8, in each Zone of a Service Area, one SSID is transmitted and at least one, by possibly several, NRI's are transmitted, as indicated by N1, N2, etc. Thus, one Zone is potentially affiliated with multiple Networks or Service Areas, and would be required to transmit corresponding NRI's. The boundaries shown FIG. 8 depict functional boundaries, and not necessarily geographical boundaries. However, no matter where geographically located, all Service Areas within a common Network are required to transmit the same NID sequence or Network identifier. Individual Service Areas within a Network are specified by the Service Area identifier.

Figure 9:
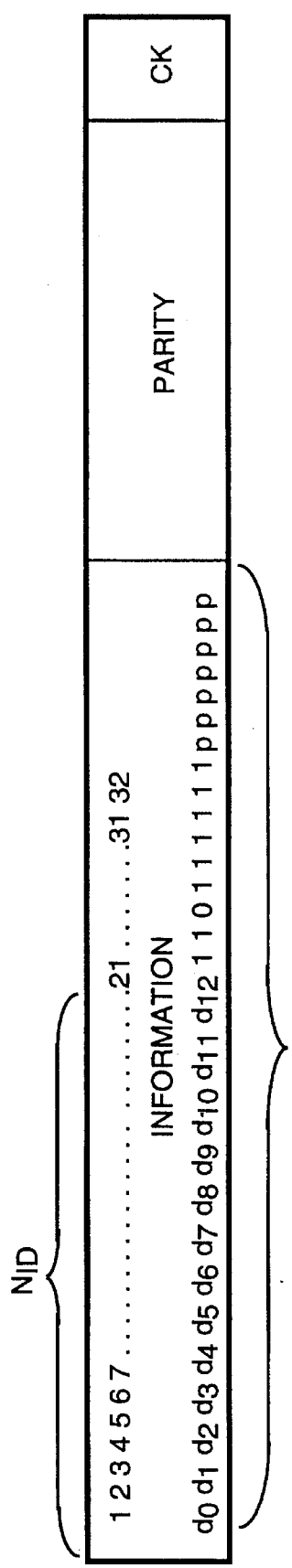
FIG. 9 and 10 illustrate structures of an address word and a vector word, respectively, in which network roaming identification (NRI) information is coded in accordance with the present invention.
Figure 10:
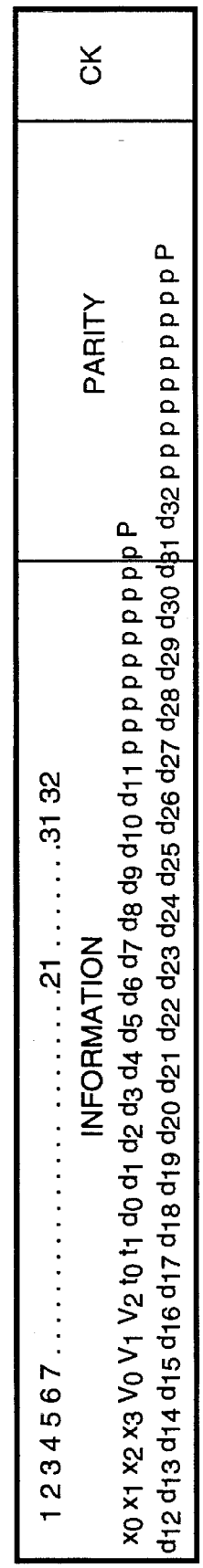

FIGS. 9 and 10 illustrate the manner in which the NRI is encoded in the signal transmitted in each Service Zone. FIG. 10 illustrates a conventional 32-21 binary coded hexadecimal (BCH) address word, which is well known in the art. The first, 21 bits, d0–d20 of this word are used to define an NID, 12 bits of which are used to uniquely identify 4096 networks, as an example.

FIG. 10 illustrates the vector word structure associated with the address word of FIG. 9. The table below gives the bit definitions associated with the vector word of FIG. 10.

| $t_1t_0$ | $d_{11}d_{10}d_9d_8\ d_7d_6d_5d_4\ d_3d_2d_1d_0$ | |
|---|---|---|
| 00 | $c_3c_2c_1c_0b_3b_2b_1b_0a_3a_2a_1a_0$ | - 3 Numeric Characters with Short Address or 8 Numeric Characters with Long Add. |
|  | $a_{11}a_{10}a_9 \ldots a_0$ | or 12 bits usable for Roaming Networks |
| 01 | $s_8s_7s_6s_5s_4s_3s_2s_1s_0S_2S_1S_0$ - | 8 Sources plus 9 or 30 Unused Bits |
| 10 | $s_1s_0R_0N_5N_4N_3N_2N_1N_0S_2S_1S_0$ | 8 Sources, 0–63 Message Number, Message Retrieval Flag, and 2 or 23 Unused bits |
| 11 |  | Spare Message Type |

Bits V0V1V2 are used to specify the vector type, such an numeric, tone-only, etc. When the V0V1V2 are set to a value corresponding to a particular type, such as short message/tone only, this signifies that the 12 bits d0–d11 specify a Service Area, Traffic Splitting Flags and Network multiplier. For example, a0–a4 define the Service Area (32 possible) a5–a8 are the Traffic Splitting Flags and a9–a11 are Network multiplier bits. The Network multiplier bits allow for 8 times 4096 more unique NID's.

Similar to the case of a Coverage Area 110, it is desirable to transmit group ("system") messages within a Network 200. Furthermore, it is desirable to designate certain levels of group messages. Specifically, a Network-wide group message is designated to be transmitted throughout an entire Network. Examples of a Network-wide group message include advertisements of services offered by the Network, periodic greetings and service updates to receivers that are roaming outside of a home Service Area or possibly outside of a home Network. A Network-wide group message needs to be associated with a Network identifier or NID, which is common throughout a Network. A Service Area-wide group message is designated to be transmitted in a particular Service Area(s) of a Network. Examples of Service Area-wide group messages are weather updates, special event updates, etc.

According to the present invention, it is desired that when a receiver is within its home area, one or more Zones, for example each of which are designated by an SSID (FIG. 8), then Network-wide and Service Area-wide group messages are not decoded by the receiver. This prevents unnecessary disturbances to the home or local receiver/user, such as a "Welcome to London" message transmitted every day or hour, if the user of that receiver resides in London. On the other hand, when a receiver is outside of its home area, then the group messages (Network-wide or Service Area-wide) are decodable by that receiver.

A mechanism to enable a receiver in its local or home area to over ride reception of a group message is shown in FIGS. 15 and 16, which will be described hereinafter.

In terms of incorporating the group message into the protocol of FIGS. 1–3, there are two ways in which the group message is transmitted. First, an NID is transmitted as it normally would be in the address field. The remainder of the NRI, those portions of the NRI other than the NID (traffic spliting flags, 3-bit multiplier and Service Area identifier), is placed in the message field. Specifically, a vector associated with the NID points to the remainder of the NRI in the message field. The group message associated with the NRI resides in the message field after the remainder of the NRI information. Thus, the group message is decoded by a receiver that has a stored NRI that matches the transmitted NRI.

Another way to alert a receiver of the presence of a group message is by transmitting the NRI related information twice in an address field within a frame. The first occurrence is the full NRI, including the NID, traffic splitting flags, 3-bit multiplier and Service Area identifier. The second occurrence is only the NID portion of the NRI, which has an associated vector that points to the message field where the group message is located. A receiver detects and correlates the first occurrence, the NRI and locks to the channel. The second occurrence, the NID, triggers the receiver to decode the group message associated with the address (NID). The NRI or NID may occur many times over an hour and possibly many times in a cycle, without having a message.

In either method, a Network-wide group message is achieved by associating the group message with an NID so that the group message is included for all Service Areas that are common to that NID. On the other hand, for Service-Area-wide group messages, the group message is associated with a particular full NRI. Thus, only receivers which correlate that particular full NRI will decode the (Service Area-wide) group message.

It should be understood that a receiver can store several NRI's (each with different NID's) to indicate that the receiver is subscribed to several Networks. Thus, such a receiver could find several Network matches on the same channel when all of the NRI's are converged into one system which, for example, covers a small town. One Network might service the eastern portion of the U.S., for example, and the other might service the western portion of the U.S., but the two Networks converge in the middle portion of the U.S. In the case of one system where many Networks of traffic collapse/overlap, the receiver will lock onto a channel by either NID match. In this case, the NID's act like independent addresses in the receiver and can be used to deliver independent group messages which relate to a corresponding Network.

In each Service Area, the transmitted signal includes the NRI associated with that Service Area. The placement structure of the various parts of the NRI in the signaling protocol is shown in FIGS. 12 and 13. In a receiver which is roaming in a Network, a frequency scan list is stored which includes a list of frequencies for which there is a high probability that an NRI match will be obtained. The placement structure of FIG. 13 provides for a way to predict where the NRI information can be found. In any event, when a match cannot be found from the stored scan list, then the receiver searches its entire synthesizer bandwidth. Once the receiver locks onto frame 0 on a particular frequency, a candidate frequency is qualified or disqualified quickly.

First, with reference to FIG. 11, the placement structure of the SSID information will be described, with reference to a four phase (time division multiplexed) expansion of the frame structure shown in FIG. 1. When a single phase system is used, then all of information in phases A, B, C and D collapse into the phase A. When a two phase system is used, then phases A and B collapse together to form one phase and phases C and D collapse together to form another phase.

As is well known in the art, a time division multiplexed system with multiple phases A, B, C and D provides certain traffic handling advantages for a service provider. A receiver capable of decoding information from only a single phase is assigned to a particular phase by the service provider at the time service is initiated. Some receivers are capable of decoding information from one phase at a time, but can switch to a different phase. In this case, a service provider can initially assign a receiver to a particular phase, but can use the system messages described above to inform the receiver from time to time that messages will be transmitted on a different phase. Finally, some receivers are capable of decoding multiple phases and can therefore, as shown by FIG. 11, lock onto an assigned frame quicker than a single phase receiver.

In order to provide roaming service, all channels (frequencies) in a system which are roaming-capable are required to transmit fully a predetermined number of frames. For example, it is required that all roaming channels transmit frames 0 through frame 15 with frame 0 aligned to the four minute time mark. It is established, in this example, that frames 0–15 must be present and that these frames contain the LID words LID1 and LID2 in the frames and phases as shown in FIG. 11.

Across the phases, LID1 and LID2 are offset by one frame so that a receiver assigned to a specific phase is able to determine its desired SSID presence in the least amount of search time on each channel, and to balance or distribute information overhead among the phases.

The placement structure shown in FIG. 11 provides a known time position to allow for quick processing of candidate frequencies when a receiver is roaming. If the roaming decision can be made on the basis of LID's only, then 16 channels can be processed every four minutes. Since frames 0–15 must be present, a fast scan over a large bandwidth is made possible using symbol rate detection to identify roaming capable channels. LID2 is transmitted only in each phase once per cycle and LID1 is transmitted every four frames, once in each phase (in at least frames 0–15).

On all frequencies (channels) which are roaming capable, only frames 16–127 may be shared with other service providers or replaced with an alternate protocol. When a frame is transmitted, it must contain a predetermined SSID pattern, such as, for example, the LID following the pattern established in frames 0–15.

"T" refers to the optional presence of three block information words sent out in frame 0 on a rotating basis to indicate time and calendar information, as described above. The "T" type block information words are sent out in all 4, 2 or 1 phases depending on the system operating speed. It takes 3 cycles to completely refresh a receiver with a complete set of time and calendar information (5 updates each hour). The time/calendar instructions are optional, but when carried by the system, are required to follow the rotating pattern of one selection in every cycle. This format provides a known time/calendar position to permit a receiver to quickly process the candidate frequencies when roaming. The rotational sequence is changeable so that a "T" block information word format 101 is used to send a roaming system message when needed.

FIG. 12 illustrates a first placement configuration for NRI information, identified N1–N10. Like the LID's, the SSID information, NRI information is required to appear once during frames 0–15. Thereafter, the pattern optionally continues in those additional frames available. When a service provider chooses to continue the NRI placement sequence past frame 15, the sequence must include all NRI's active on the channel. The pattern shifts positions across phases and flames every four minutes (1 cycle) allowing a single phase pager which is synchronously decoding a channel to eventually see the NRI in its assigned frame. The detection of an NRI twice indicates that all NRI's have been examined.

The placement of 10 NRI's N1–N10 are shown in FIG. 12 as an example. The NRI's are placed sequentially through the phases in an offset fashion, similar to the SSID placement structure of FIG. 11. When a single phase is transmitted, then all of the information collapses into a single phase such that a different NRI appears in each of frame 0 through frame 9. This structure is processed such that the sequence is offset by at least one frame in the next cycle to avoiding shadowing problems.

Turning to FIG. 13, a second placement sequence for NRI information will be described. In this sequence, all NRI's supported on a channel are required to appear at least once during frames 0–15. However, according to this configuration, an expected or predicted position for an NRI is determined by the following set of rules:

(a) Each frequency or channel is represented by a number in the range of 0–15. M=Modulo16 of Integer {Freq kHz/Channel Spacing kHz}

(b) N=Modulo16 of NID (4 least significant bits);

(c) C=cycle number (0–15); and (d) Expected frame=F=Modulo16 of N+M+C.

According these rules, it is possible to search 16 consecutive frequencies for the same NRI in the 30 second (16 frame) period at the beginning of each 4 minute period of time. It also causes the NRI to shift one frame each cycle which alleviates possible "shadow" problems in the case of a receiver located where two systems have overlap. This placement sequence has a lower NRI "overhead" for cases where the channel carries less than 16 NRI's.

In order to alert a pager that a group message is present, the NRI that corresponds to the group message is transmitted twice during Frames 0–15. The second occurrence enables reception of the group message and acts s a normal address to send Numeric, Alphanumeric or HEX/Binary messages. Furthermore, sending the NRI twice allows receivers to predict the Frame and Phase of addressed message using the same rules described in conjunction with FIG. 13.

Figure 14:
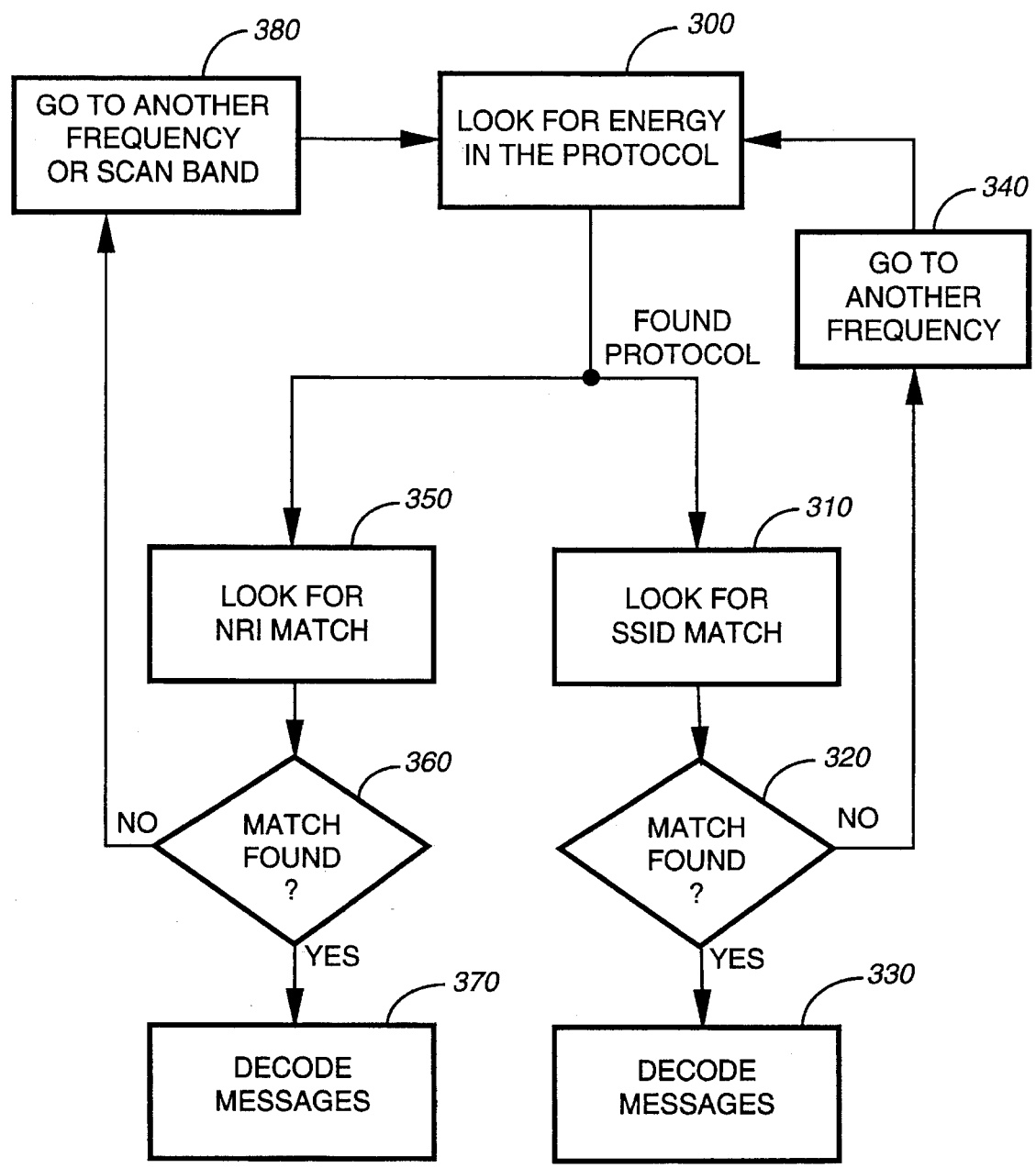
FIG. 14 is a flow chart generally illustrating how a receiver detects SSID and NRI information.

Turning now to FIG. 14, a procedure by which a roaming receiver decodes a message will be described. From the outset, it should be understood that there are a variety of receivers capable of roaming in accordance with the present invention, including single frequency receivers and frequency synthesized receivers which can lock to any frequency in a predetermined bandwidth. Also, both of these receivers may be fixed phase, variable phase or multiple phase receivers.

Regardless of receiver type, when entering a new area in which a receiver has yet to lock onto a signal transmitted in accordance with an established protocol, it is likely that from the last message receiving session the receiver has an approximation of the occurrence of frame 0 at some frequency. The accuracy of this approximation is dependent on the crystal oscillator in the receiver.

In step 300, the receiver attempts to detect energy in the protocol on the last frequency on which it operated. When the receiver has an SSID subscription, the procedure follows on the right side of the flow chart. When the receiver has an Network coverage subscription, the procedure goes to the left side of the flow chart.

In step 310, once frame 0 of a cycle is found, the receiver can detect and compare the SSID information encoded in the transmitted signal with its stored SSID information. This process is performed according to the placement rules described in conjunction with FIG. 11. When a match is found as indicated in step 320, the receiver can locate its assigned frame to decode the message(s) addressed to it in step 330.

However, if the SSID in the transmitted signal does not match with the SSID stored in the receiver (accounting for the current frequency of the receiver), then in step 340, the receiver switches to another frequency, if it is capable of doing so. When the receiver is a single frequency receiver, then it cannot tune to another frequency and will enter a time-out mode and/or a message is optionally displayed on a display of the receiver indicating its inability to receive messages in that current location of the receiver.

When the receiver has only NRI information stored in it, then from step 300, the procedure goes to step 350 and looks for an NRI match, taking into account the NRI placement rules of FIG. 12 or FIG. 13. When a match is found as indicated in step 360, the receiver locates its assigned frame and decodes its addressed messages in step 370.

However, in the event that a match is not found in step 360, in step 380 the receiver tunes to another frequency by referring to a recent list of frequencies where matches have been previously found. When no such list exists in the receiver, then the receiver begins scanning across its band to look for energy in the protocol and the process repeats from step 300.

When a single frequency receiver subscribes to Network coverage, then if a match is not found in step 350, a message is optionally displayed on the receiver that the user has gone outside a subscription area, the receiver is not functioning properly, or the service provider is not transmitting information on that frequency. A time out period is initiated and the process repeated some period of time later in an attempt to find an NRI match.

Below an example of a scan list is shown. Generally, the first entry in the list is the last frequency and associated SSID or NRI that the receiver locked to. That is, a receiver will first look for an SSID match before looking to match an NRI, and will look for an NRI match after exhausting all possible SSID matches. An SSID match can be determined quickly. The NRI's are listed with an associated frequency. A receiver attempts to lock to the last frequency and associated SSID or NRI on which it received messages, and then proceeds through the SSID information, and finally the NRI information.

| FREQUENCY | SSID | NRI |
|---|---|---|
| Frequency 1 | — | NID1 |
| Frequency 2 | SSID2 | |
| Frequency 5 | SSID3 | NID1 |
| Frequency 3 | — | NID1 |
| Frequency 4 | — | NID1 |
| Frequency N | SSIDN | NID1 |

FIG. 15 illustrates how a group message is transmitted according to the present invention. Two methods of encoding of the group message into the protocol of FIGS. 1–3 has been described above. In step 600, the group message is generated in a paging terminal (FIG. 18) or other portion of a paging transmitter station. The group message is designated as either a Network-wide group message or a Service Area-wide group message in step 610. If it is designated a Network-wide group message, then in step 620, the group message is associated with an NID to permit transmission throughout an entire Network. It is envisioned that a Network-wide group message may be associated with multiple Networks through multiple NID's. In any event, in step 630, the Network-wide group message is transmitted the Network corresponding to the NID to which the group message is associated.

On the other hand, if a group message is designated a Service Area-wide group message in step 610, then in step 640, the group message is associated with a full NRI (NID, Service Area identifier, 3-bit multiplier, etc.). Finally, in step 650, the Service Area-wide group message is transmitted in the Service Area corresponding to the NRI to which the group message is associated. It is envisioned that a Service Area-wide group message may be associated with multiple Service Areas through multiple NRI's. This is particularly useful for sending a group message to Service Areas in a particular geographical region, or in a particular time zone, etc. However, as the number of Service Areas increase, it may become more efficient to transmit the group message throughout the entire Network.

With reference to FIG. 16, the procedure by which a receiver decodes or does not decode a transmitted group message will be described. In step 700, the receiver receives the signal transmitted in the Zone or Service Area where it is located. In so doing, in step 710, the receiver first examines the signal to determine if an SSID is in the transmitted signal matches a stored SSID in the receiver. In step 720, if an SSID match is determined, which is an indication that the receiver is in a "local" or "home" Zone, then in step 730, any Network-wide or Service Area-wide group message is ignored and is not decoded. When an SSID match is not made in step 720, then in step 740 the receiver examines the signal to determine if an NRI in the transmitted signal matches the stored NRI in the receiver. When an NRI match is made, then in step 750, which occurs when the receiver is outside of a local or home Zone (because an SSID match was not made), the Network-wide or Service Area-wide group message is decoded. The manner in which the group message is decoded depends on which encoding method, described above, is used, and whether the group message is a Network-wide group message or a Service Area-wide group message.

Thus, the SSID is used to over ride a Network-wide or Service Area wide group message. When a receiver makes an SSID match, which can occur only when the receiver is located in a local or home Zone, then Network-wide and Service Area-wide group messages are ignored. On the other hand, when an SSID match cannot be made, which occurs only when the receiver is located outside of its local or home Zone, the Network-wide and Service Area-wide group messages are decoded.

Thus, a group messaging method according to the present invention involves:

dividing a Network into a plurality of service areas, each service area comprising at least one zone;

assigning to each network a network roaming identifier (NRI) which comprises at least a network identifier (NID) and a service area identifier such that the network identifier is common throughout a network, the service area identifier for identifying a service area within a network;

assigning to each service area at least one system identifier (SSID) which comprises at least a local service provider identifier and a zone identifier for identifying a zone within a service area;

storing in at least one receiver subscribed for receiving messages in a particular network and in at least one particular service area in the particular network, a network roaming identifier associated with the particular network and at least one particular system identifier associated with the at least one particular service area;

generating a group message designated for a select group of receivers in a network;

associating the group message with at least a portion of the network roaming identifier;

generating a signal for transmission in each zone, the signal including at least one network roaming identifier corresponding to a network that includes a service area corresponding to that zone and a system identifier corresponding to that zone;

transmitting the signal in each zone;

in the at least one receiver, receiving a signal transmitted in a zone and decoding the system identifier in the signal and when the decoded system identifier corresponds to the at least one particular system identifier stored in the at least one receiver, ignoring the network roaming identifier and group message associated therewith in the received signal so as not to receive the group message, and when the at least one receiver determines that the decoded system identifier does not correspond to the stored particular system identifier, decoding the network roaming identifier and the group message associated therewith.

Summarizing, in order to indicate to a receiver that a group message is present in the transmitted signal, the step of transmitting comprises either transmitting the NID portion of the NRI in the address field, and placing the remaining portion of the NRI in the message field, followed by the group message. Alternatively, the step of transmitting involves transmitting the NID twice in a frame. The first occurrence is in conjunction with the occurrence of a full NRI twice to provide normal channel lock to recover addressed messages. The second occurrence is the NID which points to a group message in the message field.

Furthermore, the group message may either be a Network-wide group message, in which case it is associated with a Network identifier (NID), or a Service Area-wide group message, in which case it is associated with a full NRI.

In other words, the receiver, by locking onto a channel through an SSID, over rides the group message so as not to decode it. This occurs primarily when the receiver is in a "local" or "home" Zone of coverage where such an SSID is being transmitted. On the other hand, when the receiver cannot lock onto a channel through an NRI, then the decoding of a group message is not disabled and the receiver will decode the group message. This is the case when the receiver is outside of its "local" or "home" Zone of coverage where the receiver can receive messages only through matching an NRI or NID.

It is envisioned that in a receiver, several SSID's are possibly stored, and at least one SSID is designated a "home" SSID. There may be several "home" SSID's. This means that the receiver will attempt to match a received SSID in a transmitted signal with its home SSID('s) before attempting to match with other stored SSID's or possibly a stored NRI. In some circumstances, it is envisioned that when a match to a home SSID is not achieved, the receiver is programmed to search for an NRI match before attempting to match to the other non-home SSID's.

Figure 17:
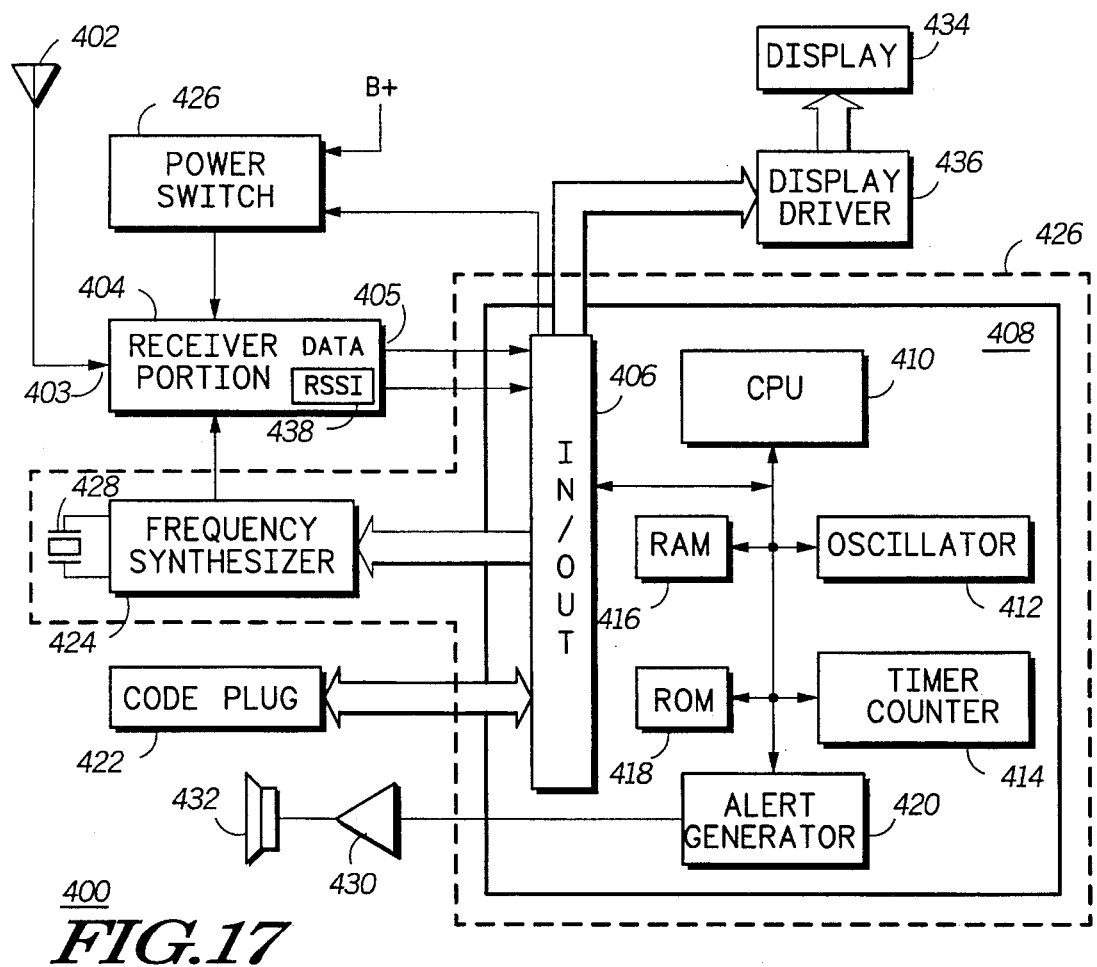
FIG. 17 is an electrical block diagram of a selective call receiver in accordance with the present invention.

FIG. 17 shows an exemplary electrical block diagram of a receiver 400, and particularly a selective call receiver, according to the present invention. Coded message signals transmitted are received by an antenna 402 which couples to the input 403 of the receiver portion 404. The receiver portion 404 preferably is an FM receiver. The received coded message signals are processed by receiver portion 404 in a manner well known in the art, and provided at the output 405 as a stream of binary information. The output 405 couples to the input/output (I/O) port 406 of the microcomputer 408. Receiver portion 404 optionally includes received signal strength indicating (RSV) means 438 which also connects to the I/O port 406 of the microcomputer 408.

Microcomputer 408, which is embodied, for example, by a Motorola MC68HC05 series microcomputer, performs a variety of functions, including decoding the binary information. Microcomputer 408 includes a CPU 410, oscillator 412, timer counter 414, random access memory (RAM) 416, read only memory (ROM) 418 and alert tone generator 420. CPU 410 controls the operation of receiver 400 and processes the received coded message signals. Oscillator 412 provides the clock for the operation of the CPU 410, and provides the reference clock for timer counter 414. The oscillator 414 is controlled by a crystal, not shown in the diagram. Assigned transmission slot and channel identification information and pager addresses are stored in code plug 422, which is a programmable read only memory, such as an electrically erasable programmable read only memory (EPROM). In addition, the SSID information and NRI information is also stored in the code plug 422. The RAM 416 is used to store code plug information when the receiver 400 is initially turned on, and to store messages as they are received. ROM 418 contains the firmware which controls the microcomputer operation. The firmware includes such programs as for controlling the decoding of transmission slot identify information, channel identification information, receiver address, receiver scanning frequency lists, NRI information, SSID information, and other receiver functions. Alert generator 420 generates an audible alert signal upon reception of a message.

When the receiver 400 is initially turned on, microcomputer 408 functions as a synchronization means, enabling the receiver 400 to synchronize the assigned transmission slot, after the receiver detects information in frame 0 and synchronizes to the transmitted signal. Microcomputer 408 also functions as the decoder for decoding channel identification information, SSID information and NRI information. Microcomputer 408, in conjunction with frequency synthesizer 424, functions as a channel selecting means 426 used to control the scanning of the receiver 400. Microcomputer 408, in conjunction with power switch 428, provides a battery saving function for the receiver 400.

Figure 18:
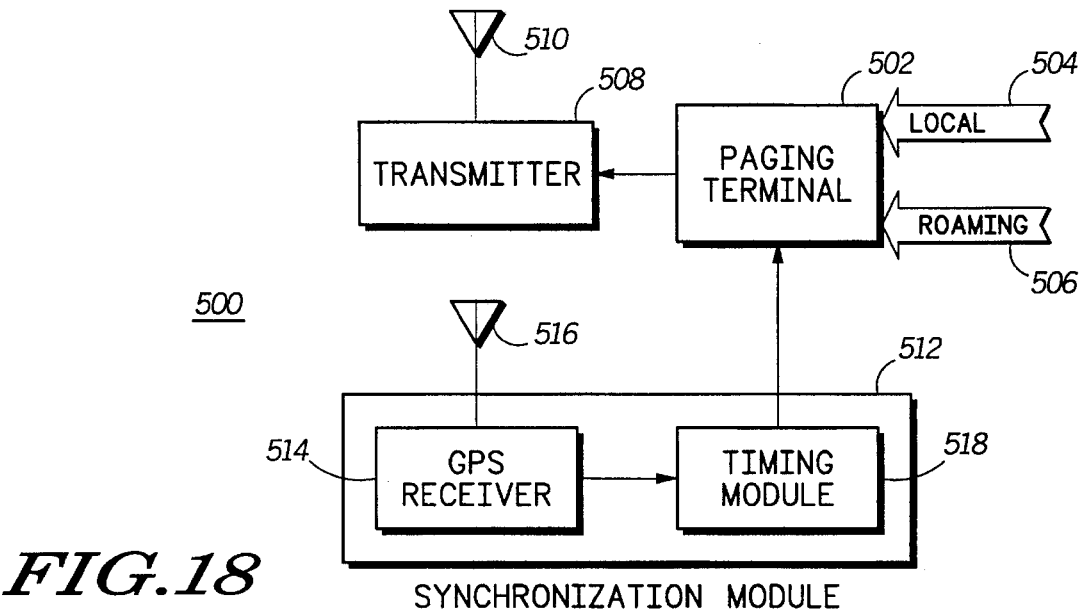
FIG. 18 is an electrical block diagram of a transmitter station in a paging system according to the present invention.

FIG. 18 illustrates an example of a transmitter station 500 useful in accordance with the present invention. Transmitter station 500 comprises a paging terminal 502 used to enter messages originated in a home or local area with respect to a receiver, as indicated at 504, or the messages are for receiver that is roaming outside its local area, as indicated at 506. Messages for a roaming receiver which are originated outside of the coverage area home or local area of a receiver are conveyed to the paging terminal 502 by a hardware interconnect with a paging terminal in the home or local area, such as a dial-up or hardwired phone line, or by means of an RF signal, such as a satellite receiver.

Messages entered into paging terminal 502 are processed for transmission into the signaling format or protocol described above, and in the aforementioned patent, or another suitable signaling protocol. The messages are placed in queues corresponding to the frame to which a receiver is assigned. The output of the paging terminal is coupled to an RF transmitter 508 for transmission via an antenna 510. It is appreciated that the paging terminal 502 optionally controls more than one transmitter, as in a wide area simulcast system, and synchronization of multiple transmitters in a simulcast system is provided. Various methods for synchronizing the transmitters are available, such as described in U.S. Pat. No. 4,718,109 to Bremen et al.

Furthermore, in order to provide for global synchronization of transmitters to frame 0 as described above, a synchronization module 512 is coupled to the paging terminal 502. The synchronization module comprises a global position system (GPS) receiver 514 and a timing module 516, which together enable the paging terminal 502 to determine an accurate occurrence of frame 0. Instead of a GPS receiver 514, another time standard signal is monitored by suitable monitoring devices.

It should be understood that although the invention has been described in connection with a particular signaling protocol, the invention is useful in connection with any synchronous signaling protocol.

The above description is intended by way of example only and is not intended to limit the present invention in any way except as set forth in the following claims.

What is claimed is:

1. A method for selectively communicating group messages to pagers in a network, the method comprising the steps of:

dividing a network into a plurality of service areas, each service area comprising at least one zone;

assigning to each network a network roaming identifier which comprises at least a network identifier and a service area identifier such that the network identifier is common throughout a network, the service area identifier for identifying a service area within a network;

assigning to each service area at least one system identifier which comprises at least a local service provider identifier and a zone identifier for identifying a zone within a service area;

storing in at least one receiver subscribed for receiving messages in a particular network and in at least one home service area in the particular network, a network roaming identifier associated with the particular network and at least one particular system identifier associated with the at least one home service area;

generating a group message to be decoded by a select group of receivers subscribed to receive messages in the particular network;

generating a signal associated with each zone for communicating addressed messages to receivers in each zone, including a step of associating within the signal the group message with the network roaming identifier corresponding to a network, the signal further including a system identifier corresponding to each zone;

transmitting in each zone the signal associated with each zone;

in the at least one receiver, receiving the signal transmitted in a zone and decoding the system identifier corresponding to the at least one home service area and ignoring the network roaming identifier so as not to receive the group message associated with the network roaming information, and when the at least one receiver determines that the decoded system identifier does not correspond to the stored particular system identifier, decoding the network roaming identifier and the group message associated therewith.

2. The method of claim 1, wherein the network roaming identifier is transmitted in at first and second occurences within a time frame, the second occurrence of the network roaming identifier having the group message associated therewith.

3. The method of claim 2, wherein the time frame comprises an address field and a message field, and wherein the network roaming identifier transmitted in the first occurrence is in the address field, and wherein the network identifier transmitted in the second occurrence is in the address field, and the group message associated with the network identifier is located in the message field.

4. The method of claim 3, wherein the step of transmitting comprises transmitting the signal in successive cycles, each cycle comprising a plurality of consecutive time frames, each time frame comprising at least a sync word, an address field, and a message field, and wherein the network roaming identifier is contained in the address field of the sync word, and wherein the system identifier is contained in the sync word.

5. The method of claim 4, wherein the network identifier corresponding to the network roaming identifier is in the address field, and the Service Area identifier corresponding to the network roaming identifier is in the message field.

6. The method of claim 1, and wherein the step of generating the group message comprises generating a network message which is designated for reception throughout a network, and wherein the step of associating the group message comprises associating the network message with a network identifier of a network roaming identifier such that the network message is designated for reception throughout a network corresponding to a network identifier.

7. The method of claim 1, wherein the step of generating the group message comprises generating a service area message designated for reception throughout a service area, and the step of associating comprises associating the service area message with an entire network roaming identifier such that the network message is designated for reception throughout a service area corresponding to a network roaming identifier.

8. A selective call receiver comprising:

a receiver circuit for receiving a transmitted signal and generating output signals, the transmitted signal including a network roaming identifier associated with a network in which the transmitted signal is transmitted and a system identifier associated with the service area in which the signal is transmitted;

a control circuit coupled to the receiver circuit and responsive to the output signals of receiver, the control circuit comprising a memory for storing a particular network roaming identifier associated with at least one particular network in which the selective call receiver is subscribed to receive messages and a system identifier associated with at least one particular service area in which the selective call receiver is subscibed to receive messages, a processor circuit for decoding the output signals from the receiver circuit in accordance with a control program, the processor circuit being programmed by the control program for:

decoding the system identifier in the transmitted signal;

determining whether the system identifier in the transmitted signal matches the particular system identifier stored in the memory;

ignoring the network roaming identifier in the transmitted signal and any group message associated with the network roaming identifier in the transmitted signal when the system identifier in the transmitted signal matches the particular system identifier; and otherwise decoding the network roaming identifier in the transmitted signal and the group message associated therewith.

9. A method for communicating messages to a plurality of addressable receivers subscribed to receive messages in a network which comprises multiple service areas, comprising steps of:

assigning to each network a network roaming identifier which comprises at least a network identifier and a service area identifier such that the network identifier is common throughout a network;

generating a signal for transmission in a service area of the network, the signal comprising a plurality of frames for consecutive transmission such that the plurality of frames define a cycle, each frame comprising substantially in sequence, synchronization information, a block information field comprising a plurality of block information words, an address field comprising a plurality of address information, a vector field comprising a plurality of vector information, and a message field comprising a plurality of messages associated with address information and corresponding vector information;

encoding in the address field of a particular frame in a cycle, a particular network identifier which includes an address word for an addressable receiver;

encoding in the vector field of the particular frame, in association with the particular network identifier at least the service area identifier, which together with the particular network identifier comprise a network roaming identifier code word;

encoding in the address field of the particular frame, a shortened network roaming identifier code word comprising the particular network identifier, in order to indicate that a network system message is being transmitted;

encoding a network system message in the message field in association with the shortened network roaming identifier code word; and transmitting the signal in the service area of the network.

10. A selective call receiver comprising:

a receiver circuit for receiving a transmitted signal and generating output signals, the transmitted signal comprising a plurality of frames consecutively transmitted such that the plurality of frames define a cycle, each frame comprising substantially in sequence, synchronization information, a block information field comprising a plurality of block information words, an address field comprising a plurality of address information, a vector field comprising a plurality of vector information, and a message field comprising a plurality of messages associated with address information and corresponding vector information;

a control circuit coupled to the receiver circuit and responsive to the output signals of the receiver circuit, the control circuit comprising a memory for storing a particular network roaming identifier associated with at least one particular network in which the selective call receiver is subscribed to receive messages and a system identifier associated with at least one particular service area in which the selective call receiver is subscribed to receive messages, a processor circuit for decoding the output signals of the receiver circuit in accordance with a control program, the processor circuit being programmed by the control program for:

decoding from the address field of a particular frame in a cycle, a network identifier which an address word for an addressable receiver;

decoding from the vector field of the particular frame, in association with the network identifier at least a service area identifier, which together with the network identifier comprise a network roaming address word;

decoding from the address field of the particular frame, a shortened network roaming identifier code word comprising the network identifier, which indicates that a network system message is being transmitted; and decoding the network system message from the message field in association with the shortened network roaming address word.

11. A method for communicating messages to a plurality of addressable receivers subscribed to receive messages in a network which comprises multiple service areas, comprising steps of:

dividing a network into a plurality of service areas, each service area comprising at least one zone;

assigning to each service area at least one system identifier which comprises at least a service provider identifier and a zone identifier for identifying a zone within a service area;

generating a signal for transmission in a service area of the network, the signal comprising a plurality of frames for consecutive transmission such that the plurality of frames define a cycle, each frame comprising substantially in sequence, synchronization information, a block information field comprising a plurality of block information words, an address field comprising a plurality of address information, a vector field comprising a plurality of vector information, and a message field comprising a plurality of messages associated with address information and corresponding vector information;

encoding into two of the block information words, a first service area identifier word comprising a local system identifier and zone identifier, and a second service area identifier word comprising traffic splitting flags and country codes;

encoding into another of the block information words system message information indicating a system message type;

encoding addresses for receivers in the address field;

encoding vector information in the vector field;

encoding system message vector in the first location of the message field; and encoding in the message field a system message in association with the system message vector.

12. A selective call receiver comprising:

a receiver circuit for receiving a transmitted signal and generating output signals, the transmitted signal comprising a plurality of frames consecutively transmitted such that the plurality of frames define a cycle, each frame comprising substantially in sequence, synchronization information, a block information field comprising a plurality of block information words, an address field comprising a plurality of address information, a vector field comprising a plurality of vector information, and a message field comprising a plurality of messages associated with address information and corresponding vector information;

a control circuit coupled to the receiver circuit and responsive to the output signals of the receiver circuit, the control circuit comprising a memory for storing a particular service area identifier associated with at least one particular service area in which the selective call receiver is subscribed to receive messages, and a processor circuit for decoding the output signals of the receiver circuit in accordance with a control program, the processor circuit being programmed by the control program for:

decoding two of the block information words that include a first service are identifier word comprising a local system identifier and zone identifier, and a second service area identifier word comprising traffic splitting flags and country codes;

decoding another of the block information words that includes system message information indicating a system message type;

determining whether the system message type corresponds to a pertinent system message for the selective call receiver;

decoding a system message vector from the first location in the message field; and decoding a system message associated with the system message vector from the message field.

* * * * *